(12) United States Patent
Wadekar et al.

(10) Patent No.: US 7,492,710 B2
(45) Date of Patent: Feb. 17, 2009

(54) PACKET FLOW CONTROL

(75) Inventors: Manoj K Wadekar, San Jose, CA (US);
Hitesh Rastogi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 650 days.

(21) Appl. No.: 11/095,786

(22) Filed: Mar. 31, 2005

(65) Prior Publication Data

US 2006/0221831 A1 Oct. 5, 2006

(51) Int. Cl.
H04L 12/26 (2006.01)
(52) U.S. Cl. ........................... 370/230; 370/468
(58) Field of Classification Search ................ 370/229, 370/232, 234, 235, 230, 468
See application file for complete search history.

(56) References Cited

U.S. PATENT DOCUMENTS

| | | | | |
|---|---|---|---|---|
| 4,967,409 | A * | 10/1990 | Narumiya et al. | 370/455 |
| 5,367,523 | A * | 11/1994 | Chang et al. | 370/235 |
| 5,734,825 | A * | 3/1998 | Lauck et al. | 709/233 |
| 7,206,285 | B2 * | 4/2007 | Loguinov | 370/235 |
| 7,333,431 | B2 * | 2/2008 | Wen et al. | 370/230.1 |
| 7,342,880 | B2 * | 3/2008 | Yanagihara et al. | 370/232 |
| 2004/0081090 | A1 | 4/2004 | Hara et al. | |
| 2006/0004837 | A1 * | 1/2006 | Genovker et al. | 707/102 |
| 2006/0109784 | A1 * | 5/2006 | Weller et al. | 370/229 |

FOREIGN PATENT DOCUMENTS

| | | |
|---|---|---|
| WO | WO-9809408 A1 | 3/1998 |
| WO | WO-2006105509 A1 | 10/2006 |

OTHER PUBLICATIONS

Haas, Zygmunt; "Adaptive admission congestion control"; ACM SIGCOMM Computer Communication Review vol. 21, Issue 5 (Oct. 1991) pp. 58-76 Year of Publication: 1991 ISSN:0146-4833.*
McAlpine, Gary, et al., "Congestion Control in a Network", U.S. Appl. No. 11/114,641; filed Apr. 25, 2005.
Wadekar, Manoj, et al., "Proposal for 802.3 Enhancements for Congestion Management", Presented at the IEEE Conference May 2004; pp. 1-23.
Comer, D. E., et al., "A Rate-based Congestion Avoidance and Control Scheme for Packet Switched Networks", Proceedings of the International conference on Distributed computing, (May 28, 1990). 390-397.

(Continued)

*Primary Examiner*—Ricky Ngo
*Assistant Examiner*—Gary Mui
(74) *Attorney, Agent, or Firm*—Grossman, Tucker, Perreault & Pfleger, PLLC

(57) ABSTRACT

A flow control method according to one embodiment may include transmitting a first plurality of packets from a transmitting node to a receiving node at an initial packet rate, and transmitting a second plurality packets from the transmitting node to the receiving node at a congested packet rate less than the initial packet rate in response to a signal from the receiving node representative of a congestion condition at the receiving node. Of course, many alternatives, variations, and modifications are possible without departing from this embodiment.

12 Claims, 6 Drawing Sheets

OTHER PUBLICATIONS

Hedge, G. et al., "IEEE 802 CMSG Tutorial", IEEE 802 Plenary tutorials, (Nov. 16, 2004).1-41.

Yang, C. et al., "A Taxonomy for Congestion Control Algorithms in Packet Switching Networks", IEEE Network, 9(4), (Jul. 1, 1995).34-35.

McAlpine, G. et al., "An Archeitechture for congestion management in Ethernet Clusters", Parallel and distributed processing symposium, (Apr. 4, 2005).1-8.

International Search Report and Written Opinion for PCT Patent Application No. PCT/US2006/012387, Mailed Sep. 5, 2006. 17 Pgs.

Office Action Received for European Patent Application No. 06749189.4, mailed (Jan. 18, 2008).6 pgs.

PCI Express Base Specification Revision 1.0; Jul. 22, 2002, 428 pgs.

PCI-X Addendum to the PCI Local Bus Specification Revision 1.0a; Jul. 24, 2000, PCI Special Interest Group, 240 pgs.

IEEE Std 802.3, Mar. 8, 2002; Revision of IEEE, STD 802.3, 2000 Edition 802.3: IEEE Standard for Information Technology—Telecommunications and information exchange between systems—Local and metropolitan area networks—Specific requirements Part 3: Carrier Sense Multiple Access with Collision Detection (CSMA/DC) Access Method and Physical Layer Specifications.

* cited by examiner

| | | |
|---|---|---|
| | 205a ↓ | |
| 302 | DESTINATION ADDRESS | 01_80_C2_00_00_01 (6 BYTES) |
| 304 | SOURCE ADDRESS | PORT MAC ADDRESS (6 BYTES) |
| 306 | TYPE | 0x8808 (2 BYTES) |
| 308 | OPCODE | 0x0011 (2 BYTES) |
| 310 | IPG_STEP | 1 - 8 (1 BYTE) |
| 312 | PRIORITY (PRIMASK) | RESERVED (1 BYTE) |
| 314 | PAD | 42 BYTES |
| 316 | CYCLIC REDUNDANCY CHECK (CRC) | 4 BYTES |

PACKET FLOW CONTROL

BACKGROUND

A variety of computer nodes may communicate with each other via a variety of communication links. Each node may function as a transmitting (source) and receiving (destination) device in order to exchange data and/or commands with each other using different communication protocols. Data and/or commands may be divided by the communication protocol into smaller packets of information for more efficient routing. A plurality of packets may be received and processed at the receiving node. As the amount of traffic increases, a congestion condition may occur at the receiving node.

When the congestion condition is encountered, some communication protocols specify that the receiving node send a pause type command back to the transmitting node. Upon receipt of the pause command, the transmitting node pauses or stops the transmission of any additional packets to the receiving node. The transmitting node may not send any additional packets to the receiving node until it receives another command from the receiving node indicating the congestion condition has ended. Alternatively, the transmitting node may wait a particular time interval before sending additional packets to the receiving node.

Such a stop and start method of handling congestion conditions suffers from several drawbacks. First, this method does not readily permit finer control over the bandwidth utilization of the communication link utilized by the transmitting and receiving node. This may create a larger latency variation for high priority traffic. Second, during persistent congestion conditions a plurality of pause type commands would be sent from the receiving node to the transmitting node resulting in poor bandwidth utilization of an already congested communication link. Third, the pause type command does not specify a quantity of available bandwidth for a given receiving node. Fourth, the pause type command may only be generated as a last resort resulting in an excessive amount of packets being dropped at the receiving node before the transmitting node stops sending additional packets. Fifth, longer latencies may develop if a lower amount of dropped packets are to be achieved as the transmitting node may spend more time in a pause mode not sending any packets.

DETAILED DESCRIPTION

The present disclosure will be described herein in connection with various embodiments and systems. Those skilled in the art will recognize that the features and advantages of the present disclosure may be implemented in a variety of configurations. It is to be understood, therefore, that the embodiments described herein are presented by way of illustration, not of limitation.

Figure 1:
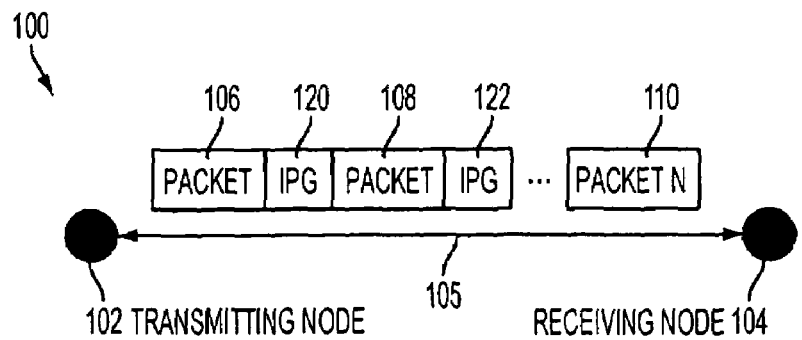
FIG. 1 is a diagram of a system having a transmitting and receiving node.

FIG. 1 illustrates a system 100 including a transmitting node 102 and receiving node 104 communicating via a communication link 105. The transmitting and receiving nodes 102, 104 may represent any variety of computer nodes which may include, for example, one or more personal computers, server systems, switches, circuit boards, etc. The communication link 105 may also be a direct link between the transmitting and receiving node in a contained network. The transmitting node 102, receiving node 104, and communication link 105 may also comprise a local area network (LAN), wide area network (WAN) and/or storage area network (SAN). The communication link 105 may be a wireless link.

The transmitting node 102 may communicate data and/or commands to the receiving node 104 via the communication link 105 consistent with a variety of communication protocols. One such communication protocol may be an Ethernet protocol. The Ethernet protocol may comply or be compatible with the Ethernet standard published by the Institute of Electrical and Electronics Engineers (IEEE) titled the IEEE 802.3 Standard, published in March, 2002 and/or later versions of this standard. Such data and/or commands may be parsed into packets consistent with the communication protocol for more efficient routing.

A plurality of packet 106, 108 . . . 110 may be transmitted by the transmitting node 102 to the receiving node 104 at an initial packet rate. The receiving node 104 may be able to detect a congestion condition. As used herein, a "congestion condition" may be an excessive accumulation of packets at the receiving node. Such a congestion condition may be detected in a variety of ways including a particular buffer of the receiving node that stores at least a portion of the incoming packets reaching a full threshold level. The transmitting node 102 may respond to the congestion condition detected at the receiving node by transmitting additional packets at a congested packet rate less than the initial packet rate. One way to control the rate of packets transmitted by the transmitting node to the receiving node is to control a length of an inter-packet gap (IPG), e.g., IPGs 120, 122 disposed between the packets 106, 108 . . . 110.

Figure 2:
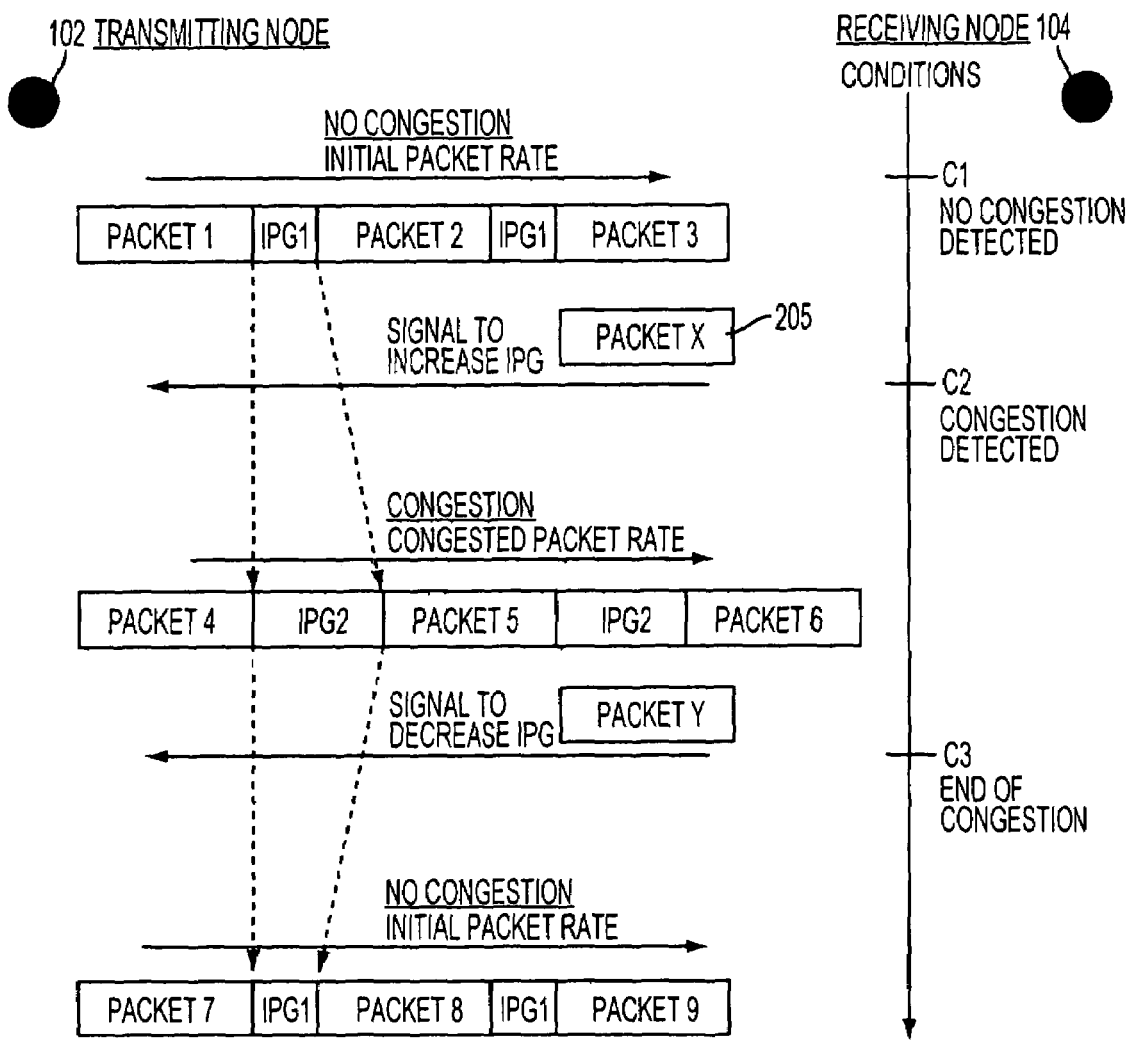
FIG. 2 is a diagram illustrating an embodiment of controlling the packet rate from the transmitting node to the receiving node of FIG. 1 by controlling an inter-packet gap.

FIG. 2 illustrates an embodiment of controlling the packet rate from the transmitting node 102 to the receiving node 104 of FIG. 1 by controlling the IPG between packets in response to a congestion condition at the receiving node 104. Initially, at condition C1 no congestion is detected by the receiving node 104. Under such a condition, the transmitting node 102 may transmit a plurality of packets at an initial packet rate. An IPG having a minimum size as determined by the communication protocol being utilized may be disposed between each packet. For instance, packets 1, 2, and 3 may be transmitted at an initial packet rate having a minimum IPG or IPG1 disposed between each packet. The packets 1, 2, and 3 may comply with the Ethernet communication protocol and, as such, the minimum IPG or IPG1 may be 12 bytes or 96 bits.

Communication between the transmitting and receiving node may continue at the initial packet rate until a congestion condition is detected at the receiving node 104 at Condition C2. Again, one way of detecting the congestion condition is for a particular buffer of the receiving node that stores at least a portion of the incoming packets to reach a full threshold level. In response to detection of the congestion condition, the receiving node may transmit a signal to the transmitting node instructing the transmitting node to slow the rate of packets. The signal may include packet x 205 having instructions to increase the current IPG1 level to a particular IPG2 level in order to effectively slow the rate of incoming packets to the receiving node 104.

In response to the signal from the receiving node, e.g., packet x 205, the transmitting node may increase the IPG disposed between packets. The transmitting node may therefore still transmit packets to the receiving node, yet at a slower packet rate compared to the initial packet rate with no congestion condition. For instance, packets 4, 5, and 6 may have IPG2 disposed between the packets, where IPG2>IPG1. The length of IPG2 compared to IPG1 may be selected in response to the severity of the congestion condition. In general, for a severe congestion condition, IPG2 may be selected to result in a large differential between IPG2 and IPG1 to considerably slow the packet rate. For a less severe congestion condition, IPG2 may be selected to result in a comparatively smaller differential between IPG2 and IPG1 than for the severe congestion condition to more slightly slow the packet rate. Hence, the packet rate may advantageously be finely tuned or controlled by controlling the length of IPG2.

At condition C3, the receiving node may detect an end of the data congestion condition. In one embodiment, this may be detected by the receiving node when the level of data in the receive buffer reaches a low threshold level. After detection of the end of the data congestion condition, the receiving node may send another signal, e.g., packet y, instructing the transmitting node to decrease IPG2 back to IPG1 in order to increase the packet rate back to the initial packet rate. In response, the transmitting node may now send additional packets at the faster initial packet rate. For example, packets 7, 8, and 9 may now have IPG1 disposed between each packet.

Figures 3, 4:
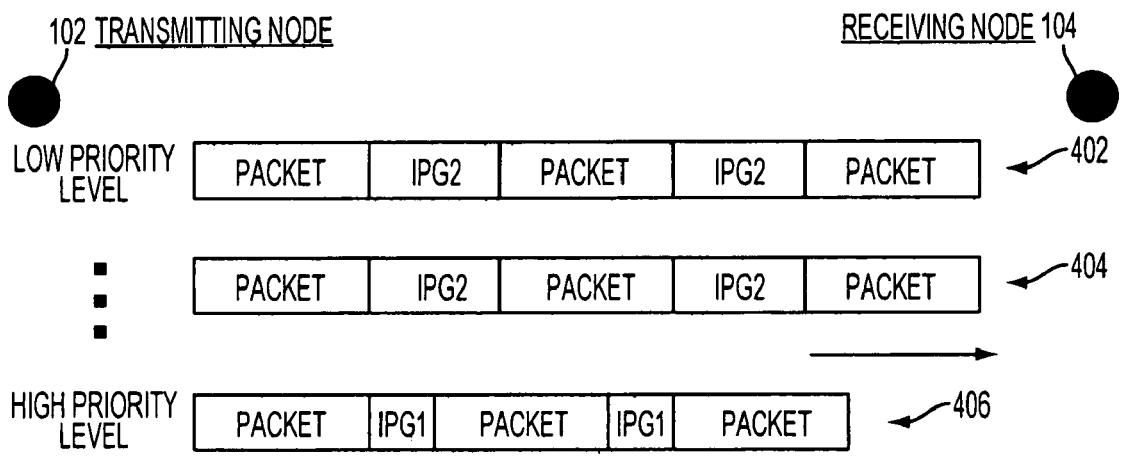
FIG. 3 is a diagram of one embodiment of a packet that may be sent from the receiving node to the transmitting node in response to detection of a congestion condition.
FIG. 4 is a diagram illustrating one embodiment to treat different priority traffic from the transmitting to the receiving node.

FIG. 3 illustrates one embodiment 205a of packet x 205 of FIG. 2 that may be sent from the receiving node to the transmitting node in response to detection of a congestion condition. The packet 205a may include a destination address field 302, a source address field 304, a type field 306, an Opcode field 308, an IPG_Step field 310, a priority field 312, a pad 314, and a cyclic redundancy check 316. The destination address field 302 may specify the destination address of the packet, e.g., the transmitting node 102. The destination address field may be 01_80_C2_00-00-01 which is a known Ethernet Media Access Control (MAC) address that is used for flow control. This allows the destination node to treat the packet specifically for flow control actions. This destination address field may be similar to the flow control functionality specified in the IEEE 802.3x standard published in May, 1997. The addition of the Opcode field 308 may enable continued transmission of packets at a slower rate rather than a PAUSE mechanism as detailed in the IEEE 802.3x standard. The destination address field 302 may require 6 bytes of a minimum sized 64 byte packet size for an Ethernet packet. The source address field 304 may specify the source address of the packet, e.g., the receiving node 104. The source address field 304 may also require 6 bytes. The type field 306 may specify the type of packet such as a flow control type packet.

The packet 205a may be an Ethernet flow control packet including additional fields such as the Opcode field 308, the IPG_Step field 310, and the PriMask 312 field. The Opcode field 308 may specify the type of flow control request. The type of flow control request may include a type (0x0001) specifying continued transmission of additional packets at a slower packet rate. The IPG_Step field 310 may have a plurality of steps, e.g., steps 1-8, specifying a quantity to increase the IPG. The IPG_Step may be selected in response to the severity of the congestion condition detected. For instance, the IPG_Step may be set to a larger step, e.g., step 8, in response to a severe congestion condition and may be set to a smaller step, e.g., step 1, in response to a mild congestion condition. Hence, the packet rate may be finely tuned or controlled by controlling the length of IPG via the IPG_Step field 310.

The priority (Primask) field 312 may be utilized to control specific priority traffic. Different communication protocols may have different levels of priority traffic and, in general, higher priority traffic may be favored over lower priority traffic. For instance, the Ethernet communication protocol may have eight levels of priority traffic. The priority field 312 may specify to increase the IPG on the lower priority traffic. Therefore, the congestion condition may be relieved by increasing the IPG on the lower priority traffic without increasing the IPG of the higher priority traffic. The pad field 314 may be utilized to pad the length of the packet 205a so that the packet achieves a minimum packet length. For instance, given a minimum packet length of 64 bytes and the sum of all the other fields 302, 304, 306, 308, 310, 312, and 316 totaling 22 bytes, the pad 314 may be 42 bytes. Finally, error detection codes such as the cyclic redundancy check (CRC) may be included in the packet 205a.

FIG. 4 illustrates how the priority level field 312 of the packet 205a of FIG. 3 may be utilized to sequentially increase the IPG of lower to higher priority traffic. FIG. 4 illustrates a first 402 and a second 404 plurality of lower priority packets having an increased IPG or IPG2 disposed between each packet. The IPG2 level for each plurality of packets 402, 404 may have been set by respective packets consistent with packet 205a specifying a particular IPG_step in field 310 for the particular priority level of the plurality of packets 402, 404. The plurality of higher priority packets 406 may still have a minimum IPG or IPG1.

If the congestion condition at the receiving node continues, the receiving node may instruct a continually increasing priority of level of traffic to increase its IPG. Given the particulars of the congestion condition and the amount of lower priority traffic contributing to this condition, it is possible to slow the rate of the lower priority traffic only while concurrently maintaining a higher packet rate for the higher priority traffic as illustrated in FIG. 4.

Figure 5:
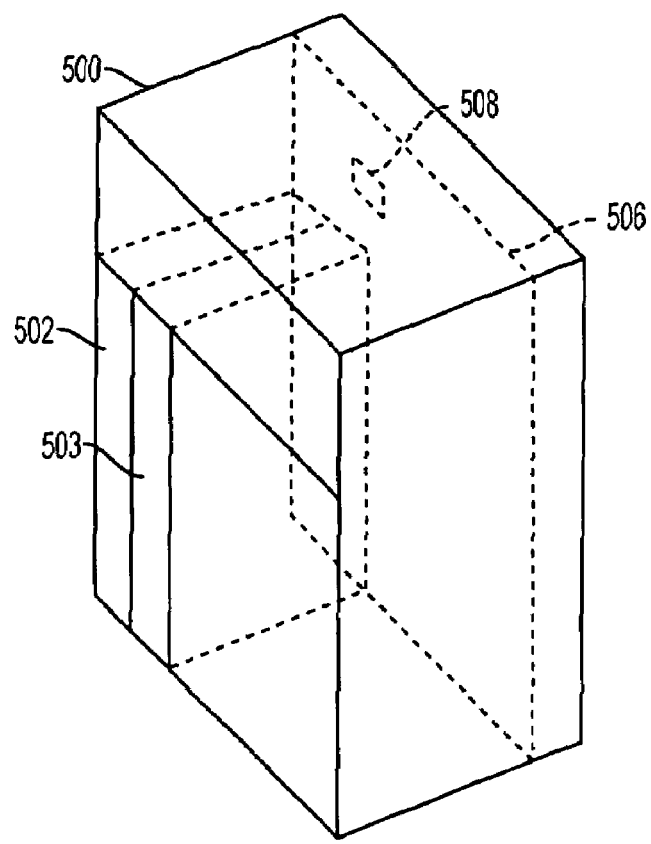
FIG. 5 is one embodiment of a transmitting and receiving node including a chassis having circuit boards and a switch.

As earlier detailed, the transmitting and receiving nodes 102, 104 may be a variety of nodes. FIG. 5 illustrates one embodiment where the transmitting and receiving nodes may be circuit boards and a switch 508. The circuit boards 502, 503 may be coupled via insertion into associated slots of the chassis 500 to a backplane 506. The backplane 506 may have the switch 508 to facilitate communication between, at least, the two circuit boards 502, 503. Only two circuit boards 502, 503 are illustrated in FIG. 5 for clarity although the chassis 500 may accept any plurality of circuit boards, e.g., 14 in one embodiment.

In one embodiment, the chassis 500 may be an Advanced Telecommunications Computing Architecture (Advanced TCA or ATCA) chassis, complying with or compatible with PCI Industrial Computer Manufacturers Group (PCIMG) rev. 3.0, Advanced Telecommunications Computing Architecture (ATCA), published Dec. 30, 2002. According to this embodiment, the circuit boards 502, 503 disposed within the chassis 500 may be ATCA boards, also referred to as ATCA blades or blades herein. The ATCA blades upon proper insertion into associated slots in the chassis 500 may be mechanically coupled to the chassis 500 and electrically coupled to the backplane 506. The backplane 506 may be the primary interconnect board of the chassis 500 and provide a number of connections for each ATCA blade such as a connection to a power riser board and a data riser board.

Figure 6:
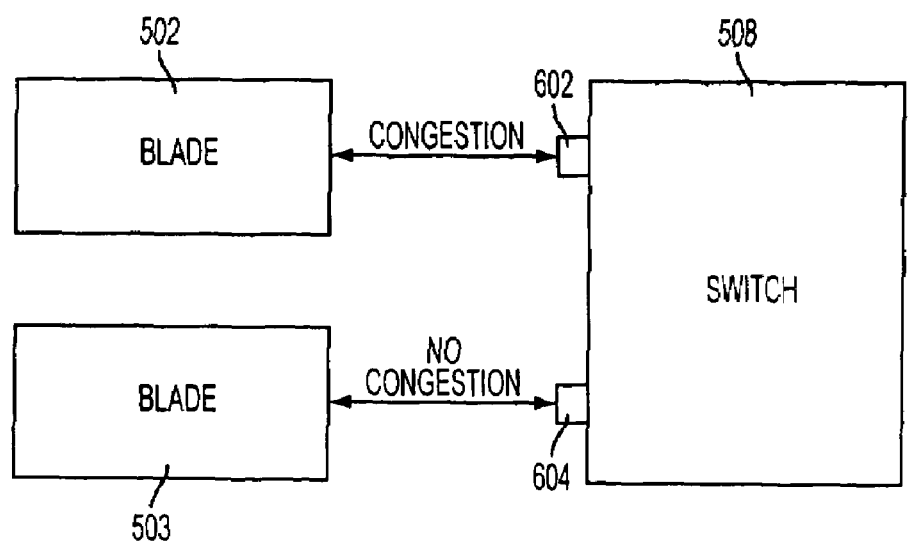
FIG. 6 is a diagram of two circuit boards and the switch of FIG. 5.

FIG. 6 illustrates the two blades 502, 503 and the switch 508 of FIG. 5. Each blade 502, 503 may be coupled to the switch 508 via an associated port 602, 604. For simplicity only two blades 502, 503 and one switch 508 are illustrated although any plurality of blades and switch combinations may be utilized. The switch 508 may capable of detecting a congestion condition at each port 602, 604 and may detect a congestion condition at one port 602 but not another port 604. The switch 508 may then control the flow of packets to the congested port 602 from blade 502 to a congested packet rate, e.g., by increasing the IPG between packets. At the same time, the switch 508 may enable a maximum packet arrival rate at the non-congested port 604 coupled to the other blade 503.

Figure 7:
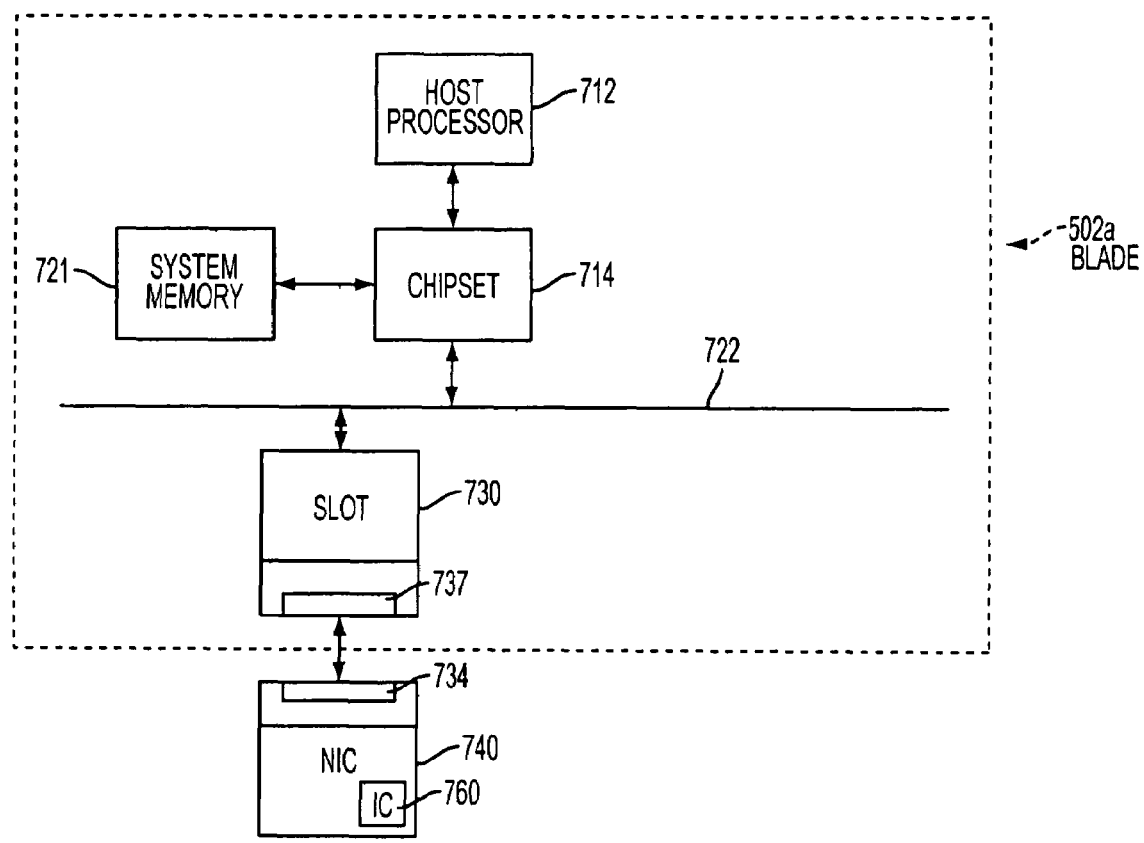
FIG. 7 is a diagram of one embodiment of the circuit board of FIGS. 4 and 5.

FIG. 7 illustrates one embodiment 502a of the blade 502 of FIGS. 5 and 6. The blade 502a may include a host processor 712, a bus 722, a chipset 714, system memory 721, a card slot 730, and a network interface card (NIC) 740. The host processor 712 may include one or more processors known in the art such as an Intel® XEON processor commercially available from the Assignee of the subject application. The bus 722 may include various bus types to transfer data and commands. For instance, the bus 722 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 722 may alternatively comply with the PCI-X Specification Rev. 1.0a, Jul. 24, 2000, available from the aforesaid PCI Special Interest Group, Portland, Oreg., U.S.A. (hereinafter referred to as a "PCI-X bus").

The chipset 714 may include a host bridge/hub system (not shown) that couples the processor 712 and system memory 721 to each other and to the bus 722. The chipset 714 may include one or more integrated circuit chips, such as those selected from integrated circuit chipsets commercially available from the Assignee of the subject application (e.g., graphics memory and I/O controller hub chipsets), although other integrated circuit chips may also, or alternatively be used. System memory 721 may include one or more machine readable storage media such as random-access memory (RAM), dynamic RAM (DRAM), static RAM (SRAM), magnetic disk, and/or any other device that can store information.

When the NIC 740 is properly inserted into the slot 730, connectors 734 and 737 become electrically and mechanically coupled to each other. When connectors 734 and 737 are so coupled to each other, the NIC 740 becomes electrically coupled to bus 722 and may exchange data and/or commands with system memory 721 and host processor 712 via bus 722 and chipset 714.

Alternatively, without departing from this embodiment, the operative circuitry of the NIC 740 may be included in other structures, systems, and/or devices. These other structures, systems, and/or devices may be, for example, in the blade 502a and coupled to the bus 722. These other structures, systems, and/or devices may also be, for example, comprised in chipset 714. The NIC 740 may act as an intermediary between the blade 502a and other nodes to permit communication to and from the blade 502a and other nodes. One such node may be the switch 508. Communication may take place using any variety of communication protocols such as the Ethernet communication protocol.

The NIC 740 may include an integrated circuit (IC) 760. The IC 760 may include protocol engine circuitry having a MAC layer. As used herein, an "integrated circuit" or IC means a semiconductor device and/or microelectronic device, such as, for example, a semiconductor integrated circuit chip. As used herein, "circuitry" may comprise, for example, singly or in any combination, hardwired circuitry, programmable circuitry, state machine circuitry, and/or firmware that stores instructions executed by programmable circuitry. The MAC layer, which again may be part of the IC 760, may assemble packets for transmission by assembling a data portion of the packet with a header portion of the packet. To increase the IPG between packets, the MAC layer may hold the header for a longer period of time before assembling the header and data portion of the packet for transmission.

The blade 502a may also include any variety of machine readable media such as system memory 721. Machine readable program instructions may be stored in any variety of such machine readable media so that when the instructions are executed by a machine, e.g., by the processor 712 in one instance, or circuitry in another instance, it may result in the machine performing operations described herein.

Figure 8:
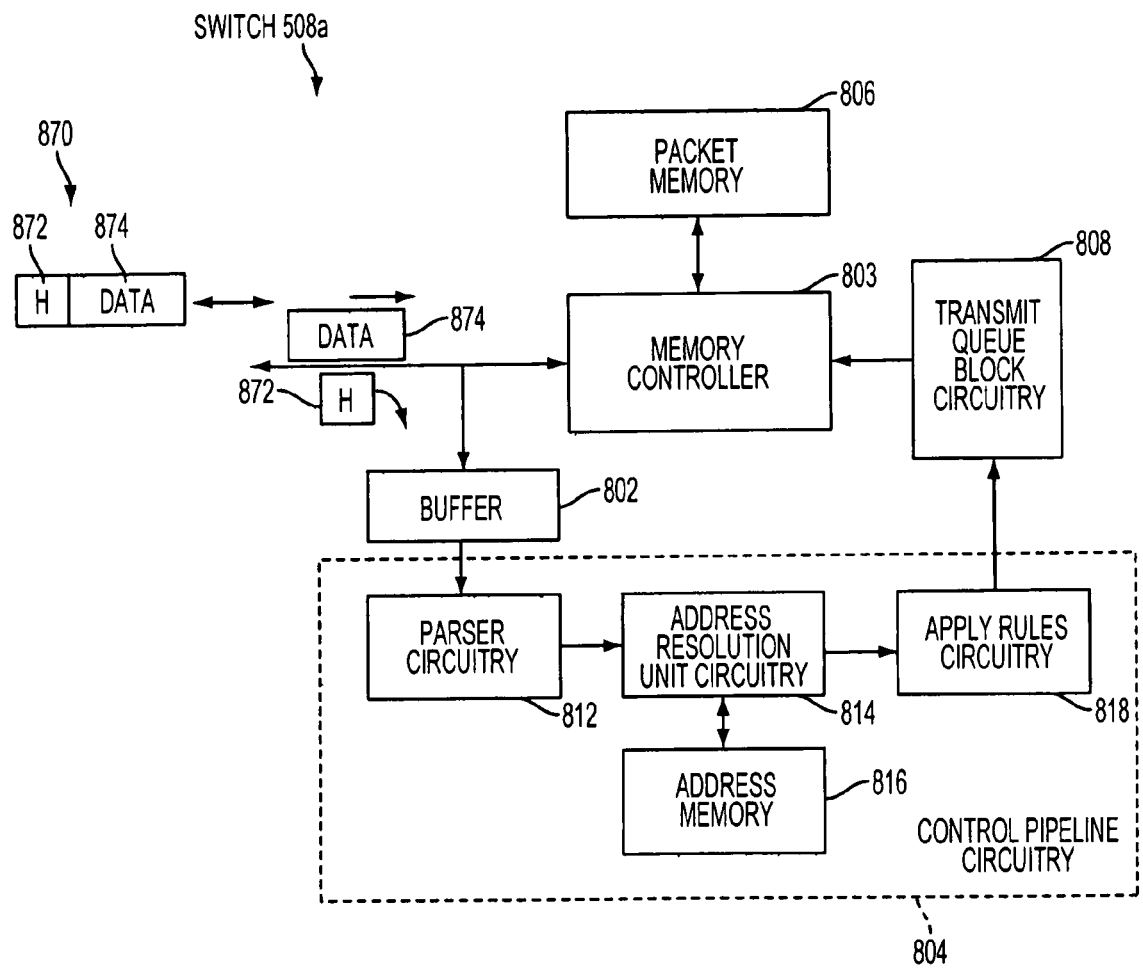
FIG. 8 is a diagram of one embodiment of the switch of FIGS. 4 and 5.

FIG. 8 illustrates one embodiment 508a of the switch 508 of FIGS. 5 and 6. The switch 508a may include a buffer 802, control pipeline circuitry 804, transmit queue block circuitry 808, memory controller 803, and packet memory 806. The control pipeline circuitry 804 may further include parser circuitry 812, address resolution unit circuitry 814, address memory 816, and apply rules circuitry 818. The switch 508a may receive a plurality of packets at various ports. Only one packet 870 is illustrated in FIG. 8 for clarity. Each packet 870 may have a header portion 872 and data portion 874. The header portion 872 may include information such as source and destination computer nodes. The data portion 874 may include any variety of data being transferred from one computer node to another.

The header portion of each packet, e.g., header portion 872 of packet 870, may be passed to the buffer 802. The buffer 802 may be a first-in first-out (FIFO) buffer in one embodiment. In response to a level of data in the buffer 802 relative to one or more threshold levels, a congestion condition may be detected by the switch 508a. The header portion of each received packet may then be passed from the buffer 802 to the control pipeline circuitry 804. The control pipeline circuitry 804 may perform a variety of operations on the header of received packets. Parser circuitry 812 may parse received headers into associated fields, e.g., source address fields and destination address fields. Address resolution unit circuitry 814 may perform associated lookups such as source, destination, and rule lookups.

The address resolution unit circuitry 814 accordingly may accesses address memory 816 to perform such lookups. Apply rules circuitry 818 may apply rules that were obtained from address resolution unit circuitry 814. The apply rules circuitry 818 may also form a transmit queue entry in the transmit queue block circuitry 808 for each packet which may then by queued into the appropriate port queue with the transmit queue block circuitry 808. When a packet is being transmitted from the switch 508a, the header portion for each packet may be obtained from the transmit queue block circuitry 808 and the data portion for each packet may be obtained from packet memory 806 by memory controller 803 and transmitted out the appropriate port. The memory controller 803 and transmit queue block circuitry 808 may be part of the MAC layer of the switch. To control the IPG between packets, the MAC layer may hold the header for a particular time interval before assembling the header and data portion of the packet for transmission. To increase the IPG, the MAC layer may hold the packet for a longer period of time before transmission.

Figure 9:
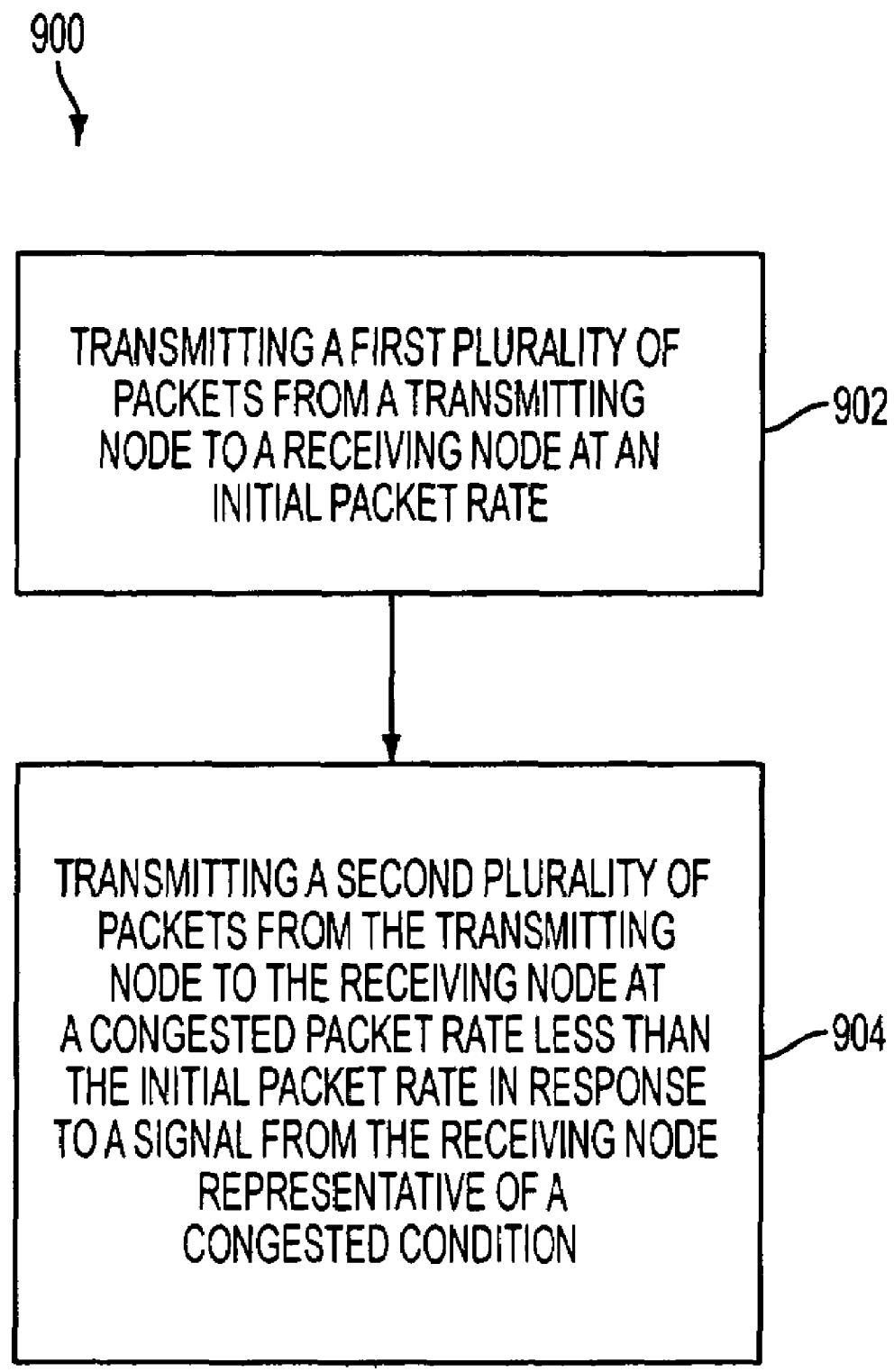
FIG. 9 is a flow chart illustrating operations that may be performed according to an embodiment.

FIG. 9 is a flow chart of operations 900 consistent with an embodiment. Operation 902 may include transmitting a first plurality of packets from a transmitting node to a receiving node at an initial packet rate. Operation 904 may include transmitting a second plurality packets from the transmitting node to the receiving node at a congested packet rate less than the initial packet rate in response to a signal from the receiving node representative of a congestion condition at the receiving node.

It will be appreciated that the functionality described for all the embodiments described herein, may be implemented using hardware, firmware, software, or a combination thereof.

Thus one embodiment may comprise an article. The article may comprise a storage medium having stored therein instructions that when executed by a machine result in the following: transmitting a first plurality of packets to a receiving node at an initial packet rate; and transmitting a second plurality packets to the receiving node at a congested packet rate less than the initial packet rate in response to a signal from the receiving node representative of a congestion condition at the receiving node.

Another embodiment may comprise a chassis. The chassis may comprise a backplane having a switch, and a circuit board accepted in a slot of the chassis and coupled to the backplane. The circuit board may be capable of communicating with the switch. The circuit board may further be capable of transmitting a first plurality of packets to the switch. The circuit board may further be capable of receiving a signal from the switch representative of a congestion condition at the switch. The circuit board may further be capable of transmitting a second plurality of packets to the switch at a congested packet rate less than the initial packet rate in response to the signal from the switch.

Another embodiment may comprise a chassis. The chassis may comprise a backplane having a switch, and a circuit board accepted in a slot of the chassis and coupled to the backplane. The circuit board may comprise a network interface card. The network interface card may be capable of communicating with the switch. The network interface card may further be capable of transmitting a first plurality of packets to the switch. The network interface card may further be capable of receiving a signal from the switch representative of a congestion condition at the switch. The network interface card may further be capable of transmitting a second plurality of packets to the switch at a congested packet rate less than the initial packet rate in response to the signal from the switch.

Yet another embodiment may comprise an Advanced Telecommunications Computing Architecture (ATCA) chassis. The ATCA chassis may comprise at least one ATCA circuit board accepted in a slot of the ATCA chassis, and a backplane having a switch. The switch may have at least one port capable of communicating with the at least one ATCA circuit board. The at least one ATCA circuit board may be capable of transmitting a first plurality of packets to the switch via the at least one port at an initial packet rate. The switch may be capable of detecting a congestion condition at the at least one port and sending a signal to the at least one ATCA board representative of the congestion condition. The at least one ATCA circuit board may be capable of transmitting a second plurality of packets to the switch at a congested packet rate less than the initial packet rate in response to the signal from the switch. The least one ATCA board may be capable of controlling a length of an inter-packet gap disposed between at least two of the second plurality of packets to change the initial packet rate to the congested packet rate. The first and second plurality of packets may comply with an Ethernet communication protocol, and the inter-packet gap may be greater than 12 bytes.

Advantageously, in these embodiments, a transmitting node may continue to transmit packets to a receiving node despite a congestion condition at the receiving node. Additional packets may be transmitted to the receiving node at a congested packet rate less than an initial packet rate when no congestion is detected at the receiving node. The congested packet rate may advantageously be finely tuned or controlled by controlling the length of the IPG between packets. As opposed to a conventional start and stop method of flow control, this method may enable a more granular control of the bandwidth available on a given communication link, and may also enable a lower packet drop rate and shorter latency. This method is beneficial in a variety of transmitting and receiving node environments and particularly in a contained network environment where the transmitting node and receiving node are located in relative proximity to each other such as an ATCA chassis for modular servers.

Controlling the IPG of a particular priority traffic flow enables further refinement and control over packet flow. Different packet rates for differing priority level packets may be concurrently achieved. This is a vast improvement over a conventional flow control method that stops all traffic, regardless of its priority level, upon detection of a congestion condition. Accordingly, the link utilization of the communication link between the transmitting and receiving node is also improved compared to conventional start and stop flow control methods.

Various ports of a switch may also be adapted to treat congestion conditions individually so that a port detecting a congestion condition may control a packet rate to its port, while other non-congested ports of the switch may continue to receive packets at a maximum packet arrival rate. The IPG may also be dynamically controlled in response to varying traffic patterns and internal resources.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A flow control method comprising:
    transmitting a first plurality of packets from a transmitting node to a receiving node at an initial packet rate;
    transmitting a second plurality of packets from said transmitting node to said receiving node at a congested packet rate less than said initial packet rate in response to a signal from said receiving node representative of a congested condition at said receiving node; and
    controlling a length of an inter-packet gap disposed between at least two of said second plurality of packets to change said initial packet rate to said congested packet rate;
    wherein said transmitting node comprises an Advanced Telecommunications Computing Architecture (ATCA) blade of an ATCA chassis and said receiving node comprises a switch of a backplane of said ATCA chassis, and wherein each of said first and second plurality of packets complies with an Ethernet communication protocol; and wherein said length of said inter-packet gap is selected in response to a portion of said signal representative of a severity of said congestion condition.

2. The method of claim 1, wherein each of said first and second plurality of packets complies with an Ethernet communication protocol, and wherein said inter-packet gap is greater than 12 bytes.

3. The method of claim 1, wherein said second plurality of packets transmitted from said transmitting node to said receiving node has a first priority level, and wherein said method further comprises transmitting a third plurality of packets from said transmitting node to said receiving node concurrently with said second plurality of packets, said third plurality of packets having a second priority level, said second priority level greater than said first priority level, and said third plurality of packets transmitted at said initial packet rate.

4. An article comprising:
a computer readable medium encoded with computer-executable instructions that when executed by said computer result in the following operations:
transmitting a first plurality of packets to a receiving node at an initial packet rate; and
transmitting a second plurality of packets to said receiving node at a congested packet rate less than said initial packet rate in response to a signal from said receiving node representative of a congestion condition at said receiving node; and
controlling a length of an inter-packet gap disposed between at least two of said second plurality of packets to change said initial packet rate to said congested packet rate;
wherein said transmitting node comprises an Advanced Telecommunications Computing Architecture (ATCA) blade of an ATCA chassis and said receiving node comprises a switch of a backplane of said ATCA chassis, and wherein each of said first and second plurality of packets complies with an Ethernet communication protocol; and wherein said length of said inter-packet gap is selected in response to a portion of said signal representative of a severity of said congestion condition.

5. The article of claim 4, wherein each of said first and second plurality of packets complies with an Ethernet communication protocol, and wherein said inter-packet gap is greater than 12 bytes.

6. The article of claim 4, wherein said second plurality of packets transmitted from said transmitting node to said receiving node has a first priority level, and wherein said instructions that when executed by said computer also result in transmitting a third plurality of packets to said receiving node concurrently with said second plurality of packets, said third plurality of packets having a second priority level, said second priority level greater than said first priority level, and said third plurality of packets transmitted at said initial packet rate.

7. A chassis comprising:
a backplane having a switch; and
a circuit board accepted in a slot of said chassis and coupled to said backplane, said circuit board for communicating with said switch, said circuit board also for transmitting a first plurality of packets to said switch, said circuit board also for receiving a signal from said switch representative of a congestion condition at said switch, and said circuit board also for transmitting a second plurality of packets to said switch at a congested packet rate less than said initial packet rate in response to said signal from said switch; and
wherein said circuit board is also for controlling a length of an inter-packet gap disposed between at least two of said second plurality of packets to change said initial packet rate to said congested packet rate; and
wherein said circuit board is also for selecting said length of said inter-packet gap in response to a portion of said signal from said switch representative of a severity of said congestion condition.

8. The chassis of claim 7 wherein each of said first and second plurality of packets complies with an Ethernet communication protocol, and wherein said inter-packet gap is greater than 12 bytes.

9. The chassis of claim 7, wherein said second plurality of packets has a first priority level, and wherein said circuit board is also for transmitting a third plurality of packets to said switch concurrently with said second plurality of packets, said third plurality of packets having a second priority level, said second priority level greater than said first priority level, and said circuit board also for transmitting said third plurality of packets at said initial packet rate.

10. An chassis comprising:
a backplane having a switch; and
a circuit board accepted in a slot of said chassis and coupled to said backplane, said circuit board comprising a network interface card, said network interface card for communicating with said switch, said network interface card also for transmitting a first plurality of packets to said switch, said network interface card also for receiving a signal from said switch representative of a congestion condition at said switch, and said network interface card also for transmitting a second plurality of packets to said switch at a congested packet rate less than said initial packet rate in response to said signal from said switch; and
wherein said network interface card is also for controlling a length of an inter-packet gap disposed between at least two of said second plurality of packets to change said initial packet rate to said congested packet rate; and
wherein said network interface card is also for selecting said length of said inter-packet gap in response to a portion of said signal from said switch representative of a severity of said congestion condition.

11. An Advanced Telecommunications Computing Architecture (ATCA) chassis comprising:
at least one ATCA circuit board accepted in a slot of said ATCA chassis; and
a backplane having a switch, said switch having at least one port for communicating with said at least one ATCA circuit board, said at least one ATCA circuit board for transmitting a first plurality of packets to said switch via said at least one port at an initial packet rate, said switch also for detecting a congestion condition at said at least one port and sending a signal to said at least one ATCA board representative of said congestion condition, said at least one ATCA circuit board transmitting a second plurality of packets to said switch at a congested packet rate less than said initial packet rate in response to said signal from said switch, said at least one ATCA board also for controlling a length of an inter-packet gap disposed between at least two of said second plurality of packets to change said initial packet rate to said congested packet rate, said first and second plurality of packets complying with an Ethernet communication protocol, and wherein said inter-packet gap is greater than 12 bytes; and wherein said at least on ATCA board is also for selecting said length of said inter-packet gap in response to a portion of said signal from said switch representative of a severity of said congestion condition.

12. The ATCA chassis of claim 11, further comprising another ATCA circuit board for transmitting a third plurality of packets to said switch via another port of said switch, switch also for permitting said third plurality of packets to be transmitted at said initial packet rate if said switch does not detect said congestion condition at said another port.

* * * * *